United States Patent [19]
Maillard

[11] 3,803,900
[45] Apr. 16, 1974

[54] LEAK DETECTION DEVICES
[75] Inventor: Pierre Maillard, Donges, France
[73] Assignee: Commissariat A L'Energie Atomique, Paris, France
[22] Filed: June 14, 1972
[21] Appl. No.: 262,613

[30] Foreign Application Priority Data
June 14, 1971 France .............................. 7121515

[52] U.S. Cl. ..................................... 73/23, 73/40.7
[51] Int. Cl. .............................................. G01m 3/20
[58] Field of Search ......... 73/23, 40.7; 55/267, 268, 55/269, 387; 324/33; 23/23 OL

[56] References Cited
UNITED STATES PATENTS

| | | | |
|---|---|---|---|
| 2,526,038 | 10/1950 | Nelson | 324/33 |
| 2,601,272 | 6/1952 | Frost, Jr. | 73/23 |
| 3,067,560 | 12/1962 | Parker | 55/269 |
| 3,280,619 | 10/1966 | Spies | 73/40.7 |
| 3,324,729 | 6/1967 | Vanderslice | 73/40.7 |
| 3,580,052 | 5/1971 | Young | 73/40.7 |
| 3,645,127 | 2/1972 | Mongodin et al. | 73/40.7 |

Primary Examiner—Charles A. Ruehl
Attorney, Agent, or Firm—Cameron, Kerkam, Sutton, Stowell & Stowell

[57] ABSTRACT

In a device for detecting leakage through the walls of an enclosure by means of a tracer gas such as helium, the gas fractions which pass through the enclosure wall are drawn into a detection circuit which comprises an adsorption element and an ionic pump placed in series.

The adsorption element comprises at least one cylindrical tube containing an adsorbing substance which is maintained against the internal tube surface by means of a grid or perforated jacket, and an axial duct through which passes a liquefied cooling fluid.

The sampling gas flows through the annular space formed between the tube and the axial duct and deflectors mounted in the space form a series of baffles on the flow path of said gas for effective trapping of its constituents with the exception of the helium which alone reaches the ionic pump.

5 Claims, 3 Drawing Figures

LEAK DETECTION DEVICES

This invention relates to improvements made in devices for detecting leakage through the walls of an enclosure by means of a tracer gas such as helium, the fractions of said gas which pass through the wall being drawn into a detection circuit which preferably comprises an ionic pump, the current produced within said pump being directly proportional to the pressure of the pumped gas.

An equipment unit is known which comprises a detector consisting as a rule of a mass spectrometer calibrated on helium and which is preferably located as close as possible to said detector, there being placed within said unit and upstream of the detector an adsorption element which is capable of stopping practically all gases with the exception of helium. Said adsorption element is constituted by a U-shaped tube packed with a suitable product and preferably activated vegetable charocoal, this product being cooled to a temperature of approximately 77° K at which its adsorptive properties are of optimum value by placing said product within a cooling enclosure such as a cryogenic vessel filled with liquid nitrogen.

Similarly, a known apparatus of more advanced design is disclosed in French patent No. 7010898 issued on Mar. 26, 1970 also in the name of Commissariat a l'Energie Atomique and entitled "Leak detection device employing helium as tracer gas". This apparatus comprises a helium pumping and detection unit placed downstream of the adsorption element which retains the gases with the exception of helium, this unit being constituted either by a vacuum pump and a pressure-measurement gage or solely by an ionic pump advantageously immersed in the coolant liquid which already contains the adsorption element, said ionic pump being intended to perform the double function of pumping and of pressure measurement.

Broadly speaking, correct operation of the detector, whether this latter is constituted either by a mass spectrometer or by an ionic pump, entails the need to ensure that the pressure of gases other than the tracer gas should be brought to a very low value at the inlet of the detector (lower than $10^{-4}$ torr or preferably lower than $10^{-6}$ torr). This reduction of pressure is obtained by adsorption of gases other than the tracer gas. In this process, the pressure drop across the adsorption element plays an essential part since, by increasing the inlet pressure, said pressure drop has the effect of increasing the adsorptive capacity of the adsorbent, thereby adjusting this capacity automatically as it were to streams of gases other than the tracer gas which arrive at the inlet of the adsorption element.

This invention is directed to further improvements in detection devices of the type mentioned in the foregoing, especially to those in which the detector itself is constituted by an ionic pump immersed in a bath of liquefied gas and directly connected to an adsorption element, said element being in turn connected:

either directly to the enclsoure which is to be tested and which has previously been evacuated, helium being subsequently applied to the enclosure walls (conventional method), or to a unit for the localized sampling of the atmosphere which surrounds the wall of the enclosure to be tested, a pressure of helium being established within said enclosure (so-called "snifting" method).

In the event of leakage, the aspirated gas stream will contain a certain quantity of helium mixed with other gases which will be retained by the adsorption element whilst the helium alone will reach the ionic pump in which the current is proportional to the number of pumped helium atoms and characterizes the leakage which has thus been detected. The main object of the invention is to make it possible, in particular by means of a specially studied structure of the adsorption element, to endow the detection device with a higher degree of efficiency combined with remarkable convenience of handling and ease of use ; and the apparatus under consideration can readily be made portable, especially by incorporating independent means for supplying electric current to the ionic pump.

To this end, the invention primarily consists in constructing the adsorption element with at least one cylindrical tube containing an adsorbing substance which is maintained against the internal surface of said tube by means of a grid or perforated jacket, and a duct which is mounted in the axis of the tube and through which passes a liquefied cooling fluid, the annular space which is formed between the tube and the axial duct and through which the sampling gas passes being provided with a series of deflectors forming successive baffles on the flow path of said gas, said space being connected at the ends of the tube, on the one hand to the inlet pipe of the device and on the other hand to the ionic pump for detection of the helium which is contained in the inlet gases and which is alone present at the outlet of the adsorption element.

In one particular embodiment of the present invention, the absorption element comprises two cylindrical tubes having parallel axes and connected respectively at one end thereof to the inlet pipe of the device and to the ionic pump and, at the other end thereof, to a connecting U-piece which provides a communication between the two tubes. As an advantageous feature, the two tubes are so arranged as to have vertical axes, the deflectors mounted within said tubes being constituted by sheet-metal members in the form of flat annular sectors defining a staggered path for the sampling gas as said gas flows downwards within the first tube and upwards within the second tube, said second tube being smaller in length than the first and connected to the ionic pump.

According to a further characteristic feature, the adsorption element and the ionic pump are immersed in the liquefied fluid usually consisting of liquefied nitrogen contained in a cryogenic vessel, the axial duct mounted in each vertical cylindrical tube of the adsorption element being so arranged as to open freely into said fluid at both ends thereof. The immersion of the ionic pump has two objects, one of which is to provide smaller lengths of piping, to reduce dead spaces and therefore to reduce the times of response and recovery. The second and most important object is to achieve a considerable reduction in degassing of the pump and therefore to reduce the background noise.

According to yet another characteristic feature, the cryogenic vessel is of metal and supports either on its cover or on the external wall a dry cell or battery and the electronic circuit for supplying the ionic pump and measuring the ion current. Said circuit comprises an ammeter which is graduated in pressure of helium and this latter is proportional, to a first-order approximation, to the rate of flow or in other words to the leakage which is detected.

Further characteristic features of a detection device as constructed in accordance with the invention will also become apparent from the following description of one exemplified embodiment which is given by way of indication without any limitation being implied, reference being made to the accompanying drawings, wherein.

Figure 1:
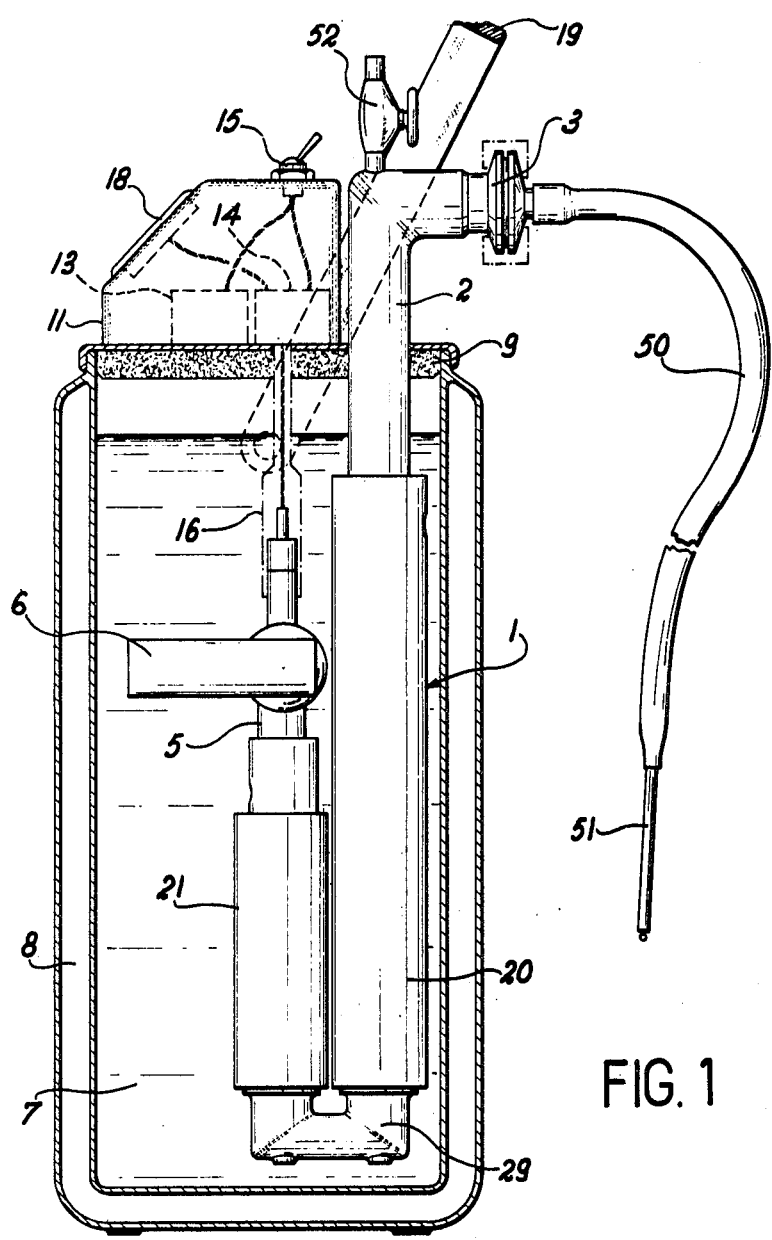
FIG. 1 is a diagrammatic view of the complete detection device under consideration and illustrating the different portions of this device.

As is apparent from FIG. 1, the detection device which is contemplated mainly comprises an adsorption element 1 which is connected by means of a pipe 2 to a coupling component 3. In the conventional method, said coupling component is connected directly to a pumping point of the enclosure to be tested ; in the "snifting" method, there is attached to said coupling component a length of flexible hose 50 connected to a sampling pipet 51 or so-called "snifter" 51. An isolating valve (not shown) which is placed in the pipe 2 makes it possible to change over from one method of use to the other without entailing any need to reheat the apparatus. The adsorption element 1, the constructional detail of which will be described hereinafter, is connected at the other end thereof and by means of a duct 5 to a conventional ionic pump 6 of the diode type in which, in the event of leakage after ionization of the molecules, the helium which is collected is entrained by means of a suitable electric field and drawn to a substantial depth within the material which forms a cathode of said ionic pump. The adsorption element 1 and the ionic pump 6 are immersed in a suitable volume 7 of a liquefied fluid usually consisting of liquid nitrogen and contained in a super-insulated cryogenic vessel 8 of metal which is closed at the top by a detachable cover 9 fitted with a heat-insulating lining.

The cryogenic metallic vessel 8 is fitted with a handle 19 which readily permits transportation and handling. The detachable cover 9 supports a casing 11 containing a dry cell or battery 13 for supplying electric current to the electronic circuit 14 which in turn supplies the ionic pump by means of a switch 15. After amplification, the ion current is measured by means of an ammeter 18 which is fixed on the casing 11. The ionic pump 6 is connected to the electronic circuit 14 by means of a high-voltage wire and a connector 16. In alternative designs, the ammeter can be completely separated from the casing and if necessary, in the case of snifting, can be mounted directly on the support of the sampling pipet 51. The measurement taken can thus be immediately read by the operator as the displacement of the pipet takes place, thus carrying out direct leakage testing.

Figure 2:
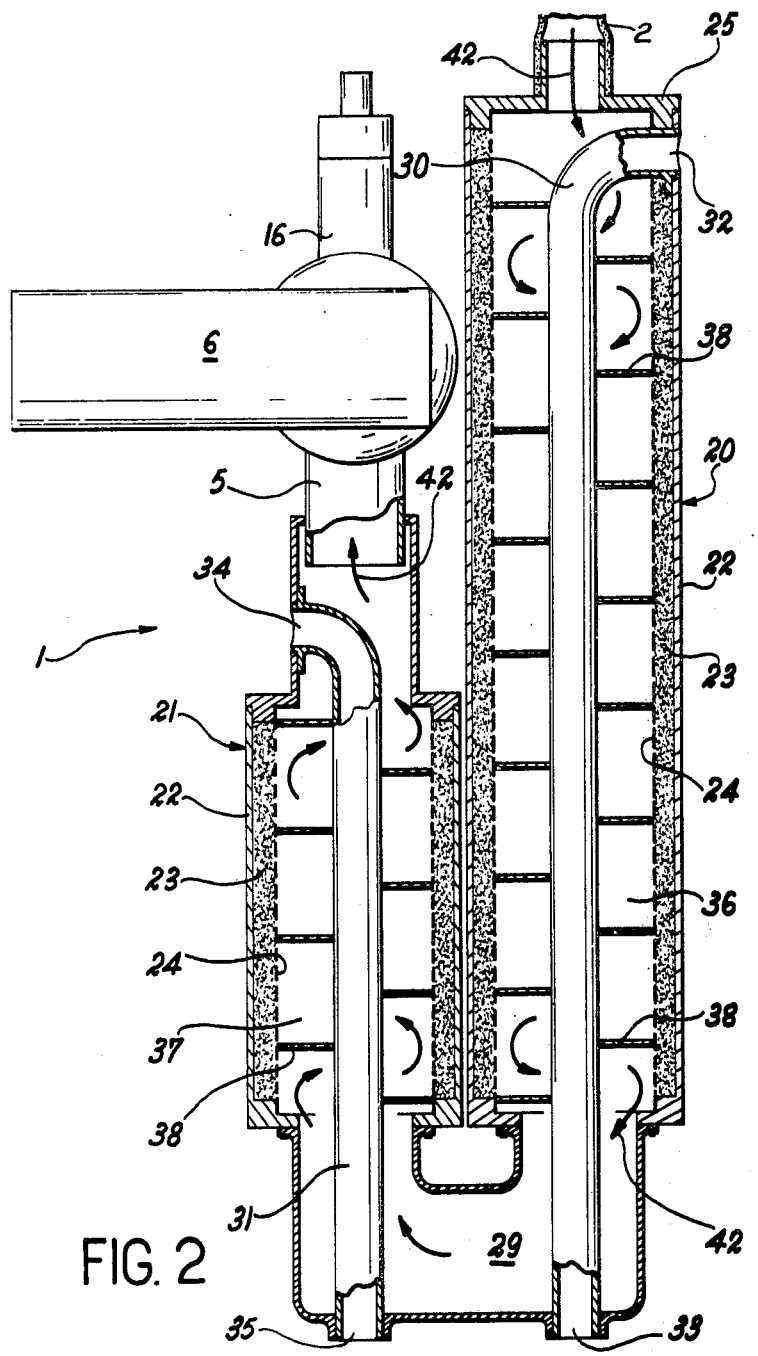
FIG. 2 is a sectional view of the adsorption element employed in the detection device of FIG. 1.

FIG. 2 illustrates to a larger scale the constructional detail of the adsorption element 1 which is employed in the detection device according to the invention. As shown in this figure, said adsorption element is mainly composed of two cylindrical tubes 20 and 21 respectively, having parallel and vertical axes and disposed in adjacent relation ; said tubes each comprise an outer jacket 22 in contact with a suitable thickness of approximately 5 mm of an adsorbing substance 23 which usually consists of activated charcoal. The thickness of adsorbing substance thus placed in contact with the outer jacket 22 is defined by the interior of the tubes 20 and 21 and by a second jacket 24 which is provided with extensive perforations and can be constituted in particular by a simple metal grid. The length of the cylindrical tube 20 is greater than that of the tube 21, the upper extremity of said tube 20 being connected by means of the pipe 2 to the inlet coupling component 3 of the device. Similarly, the second tube 21 is connected directly by means of the duct 5 to the ionic pump 6. Finally, the tubes 20 and 21 are connected together at their opposite extremities by means of a transverse U-piece 29 which provides a direct communication between these two tubes.

Each tube aforesaid is traversed along its vertical axis by a duct 30 and 31 respectively, said ducts being employed for the circulation of a liquefied fluid which, by reason of the immersion of the adsorption element 1 within the cryogenic vessel 8, consists of the liquid nitrogen which is contained within said vessel. The tube 30 has a top opening 32 in the lateral wall of the tube 20 and extends downwards through the transverse U-piece 29 to its lower extremity 33. Similarly, the duct 31 has extremities 34 and 35 which open into the volume of liquid nitrogen outside the tube 21. In order to ensure good circulation of the liquid nitrogen and to prevent any obstruction arising from condensation of ice, said tube must have a diameter of at least 8 mm.

Figure 3:
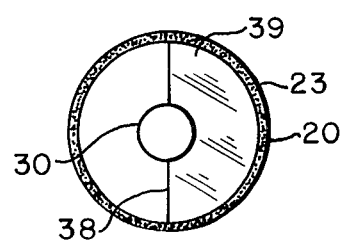
FIG. 3 is a detail view of one of the deflectors employed in the construction of the adsorption element in accordance with FIG. 2.

The annular space which is delimited within each of the aforesaid tubes 20 and 21 by the circulation ducts 30 and 31 is reserved for the circulation of the sampled gas which may contain a variable quantity of helium in the event of leakage. This annular space is designated respectively by the reference numeral 36 or 37, depending on whether it forms part of the tube 20 or the tube 21 and is provided with a series of deflectors 38 as illustrated in greater constructional detail in FIG. 3, in order to ensure that said sampled gas should be contacted more effectively with the adsorbing substance 22 within said space. Said deflectors each consist of a sheet-metal member 39 in the form of a flat annular sector having an angle which is slightly larger than 180°. The sampled gas thus follows a staggered flow path while remaining continuously in contact with the adsorbing substance 23 through the grid 24, with the result that said substance can thus be freed from all its constituents with the exception of the helium which alone reaches the ionic pump 6. Preferably, the deflectors 39 are so designed as to have a low resistance to the gas flow while ensuring that the gas is repeatedly and continuously contacted with the adsorbing substance 23, thereby permitting effective trapping of its constituents.

It should be noted that the practically immediate heating-up of the adsorbing substance which usually consists of activated charcoal permits very rapid start-up of the ionic pump, with the result that the assembly is ready to operate in a few minutes. Moreover, the construction of the adsorption element by means of two parallel tubes comprising a different number of deflectors makes it possible in a first step and as a result of partial immersion to effect rapid cooling of the charcoal which is present in the lower portion of the adsorption element, thereby establishing a forevacuum within the ionic pump to a value of approximately $10^{-6}$ torr within a few minutes. The upper layers of charcoal which are "seen" directly by the pump are thus maintained intact, with the result that pressures of the order of $10^{-9}$ torr within the pump can be very rapidly attained after complete immersion and that the detection of very small values of leakage is thus made possible.

In a particular embodiment of the device under consideration, the number of deflectors has been chosen equal to twenty-five so that the first tube 20 contains seventeen deflectors and the second tube contains only eight deflectors. The dimensions of the complete equipment unit have made it possible to house this latter within a superinsulated vessel having a capacity of 5 liters. The layer of charcoal has a thickness of 4 mm and a weight of 37 g. A thickness of this small value permits rapid cooling and accelerates the reduction in pressure at the time of start-up. The ionic pump is a conventional diode pump of 22/s. The rate of pumping of helium at the inlet of the apparatus is approximately 300 cm³/s in molecular regime. In the case of total inlet pressures of the order of $10^{-1}$ torr, said helium pumping rate is of the order of several liters/sec. The detectable helium flux is at present of the order of $5 \times 10^{-10}$ atm. cm³. $s^{-1}$. The time of continuous use of this device is approximately 10 hours with an air flow rate of 0.1 atm. cm³. $s^{-1}$; in order to regenerate the saturated adsorbent, it is only necessary to increase its temperature by approximately one hundred degrees (about $-100°C$) while pumping the desorbed gases through the fore-vacuum valve 52. The complete operation of regeneration and putting back into service requires from 5 to 10 minutes. An opening (not shown in the drawings) formed through the detachable cover 9 serves to introduce the liquid nitrogen into the vessel 8.

Among the other advantages of the detection device considered, emphasis should finally be laid on the advantage which arises from the possibility of independent power supply within a portable unit. A particular result thereby achieved is that it is no longer necessary to have recourse to the mains supply system, which in turn leads to a reduction in the number of parasites in the ion current and therefore to a considerable improvement in the instantaneous stability of the collected signal.

It is readily apparent that the invention is not limited in any sense to the exemplified embodiment which has been more especially described with reference to the drawings but extends on the contrary to all alternative forms. In particular, the grid which serves to maintain the adsorbing substance within the cylindrical tubes could be modified in particular so as to have larger holes whilst the charcoal itself could be distributed over the deflectors for the circulation of sampling gas, thereby achieving a further improvement in the contact and exchange between said gas and the adsorbing substance. Finally, consideration can be given to the possibility of constructing tubes with charcoal which adheres directly to the tube walls and to the deflectors, thereby eliminating the use of supporting grids.

What we claim is:

1. Improvements in devices for detecting leakage through the walls of an enclosure by means of a tracer gas such as helium comprising a detection circuit, the fractions of said gas which pass through the wall being drawn into said detection circuit, an adsorption element and an ionic pump connected in series in said circuit, at least one cylindrical tube for said element containing an adsorbing substance, a grid maintaining said substance against the internal surface of said tube, a duct mounted in the axis of said tube receiving a liquefied cooling fluid, a series of deflectors forming successive baffles on the flow path of said gas in the annular space between the tube and the axial duct through which the sampling gas passes, said space being connected at the ends of said tube to the inlet pipe of the device and to said ionic pump for detection of the helium contained in the inlet gases and present at the outlet of said adsorption element.

2. Improvements in accordance with claim 1, said adsorption element having two cylindrical tubes having parallel axes and connected respectively at one end thereof to the inlet pipe of the device and to said ionic pump and a U-piece at the other ends thereof connecting said two tubes.

3. Improvements in accordance with claim 2, said two tubes having vertical axes, sheet-metal flat annular sectors for said deflectors defining a staggered path for the sampling gas as said gas flows downwards within the first of said two tubes and upwards within the second of said two tubes, said second tube being shorter than said first tube and connected to said ionic pump.

4. Improvements in accordance with claim 2, said adsorption element and said ionic pump being immersed in a liquefied fluid in a cryogenic vessel, said axial duct in said tube of said adsorption element opening freely into said fluid at both ends thereof.

5. Improvements in accordance with claim 4, said cryogenic vessel being metal, an external wall for said vessel, a battery and an electronic circuit for said ionic pump on said wall, said circuit measuring the ion current, an ammeter in said circuit, a scale for said ammeter graduated in helium pressure which, to a first-order approximation, is proportional to the rate of flow and to the leakage detected.

* * * * *